Aug. 24, 1948.            J. A. BURKE, JR            2,447,486
            CONDENSER SYSTEM FOR AIRPLANE ENGINES
Filed April 17, 1945                              8 Sheets-Sheet 1

Inventor
Jerry A. Burke, Jr.

By Ralph L Chappell
Attorney

Inventor
Jerry A. Burke, Jr.

By Ralph L Chappell
Attorney

Inventor
Jerry A. Burke, Jr.
By Ralph L. Chappell
Attorney

Inventor
Jerry A. Burke, Jr.

Patented Aug. 24, 1948

2,447,486

UNITED STATES PATENT OFFICE 2,447,486

CONDENSER SYSTEM FOR AIRPLANE ENGINES

Jerry A. Burke, Jr., United States Navy

Application April 17, 1945, Serial No. 588,881

8 Claims. (Cl. 244—57)

(Granted under the act of March 3, 1883, as amended April 30, 1928; 370 O. G. 757)

This invention relates to methods and apparatus for recovering water vapor from the exhaust gases of internal combustion engines, in particular, those used as the prime movers for aircraft.

The recovery of water vapors from the exhaust gases of internal combustion engines has been practiced for a considerable time. As an example, this is a well known practice in the case of lighter than air aircraft in order to store the recovered water to maintain the trim of such craft as the fuel supply is used up.

Since substantially an equal weight of water is condensed from the exhaust gases as there is gasoline used to operate the engine, such a method has proved highly efficient for the desired purpose.

In the case of heavier than air aircraft, such recovery of the water vapors has not heretofore been practiced. However, in view of the increased altitudes to which heavier than air aircraft are now flown, the use of water injection principles, the need for a substantial water supply for use in fire fighting, and other needs for a water supply which need not be specifically enumerated here, I have devised a method and apparatus for condensing the water vapors from the exhaust gases of heavier than air aircraft. It is advantageous during war time to condense the water vapors from the exhaust gases when the airplane is flying at high altitudes because such vapors when discharged into the atmosphere leave condensate trails which make the position of the airplane apparent to the enemy. My device is so constructed that by the time the exhaust gases are discharged into the atmosphere there is substantially no water vapor remaining which will condense to leave such trails. Furthermore, the exhaust gases have been cooled to such an extent that substantially no visible flame is apparent, which makes the device an effective flame damper. While it has been previously known and practiced to warm the wings by exhaust gases to prevent ice formation, my device provides an improved apparatus which is operable to prevent ice formation on the airplane wing. Other advantages are that hot air may be provided for warming the airplane cabin and for warming devices such as machine guns, etc., which would otherwise become inoperative at low temperatures as by the congealing of the lubricants therein. In view of the substantial amount of water which is recovered with my apparatus it also provides a source of water for personal use of the airplane occupants if desired.

At the present time the supply of water to be used in the water injection system of the engines comprises a supply tank which is filled when the airplane is on the ground. This supply soon becomes exhausted and does not permit continuous operation of the water injection system. With my device, however, a continuous water supply for water injection purposes is provided, thus reducing the rate of fuel consumption of the engines.

It is, therefore, a primary object of my invention to provide a novel method and apparatus for the recovery of water from airplane engine exhaust systems.

Another important object of my invention is the provision of a built-in condenser within the wing of an airplane for the purpose of recovering water from exhaust gases.

Another object of my invention is the provision of a wing type condenser for airplanes which is an integral part of the structure of the wing and provides means for preventing ice formation as well as for recovering water from the exhaust gases.

It is another object of my invention to provide a method and apparatus to eliminate condensate trails caused by the low pressure area on top of the airplane wings and around wing tips and those caused by water in the exhaust gases.

Another object of my invention is the provision of a method and apparatus to eliminate visible exhaust flames from airplane engines.

Another object is the provision of a novel structure to provide for heating machine gun or the like installations in airplanes.

Another object is the provision of a method and apparatus for providing an ample supply of water aboard airplanes in flight by condensing the moisture in the exhaust gases from the engines.

Other objects will become apparent as the description proceeds in connection with the accompanying drawings, wherein.

Figure 3:
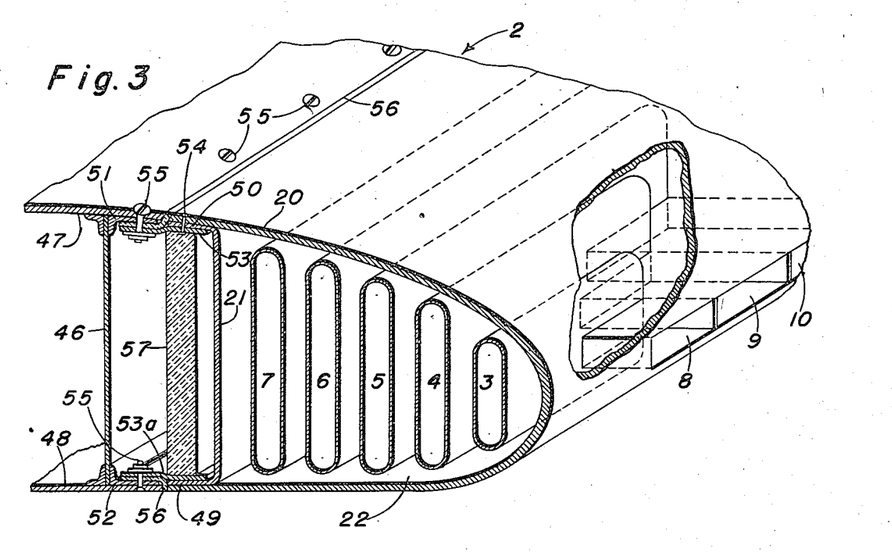
Fig. 3 is a sectional view along the line 3—3 of Fig. 1 looking in the direction of the arrows.
Figures 4, 5:
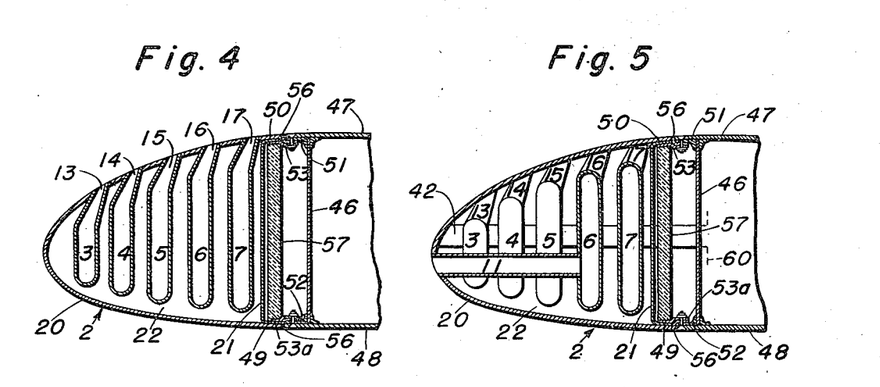
Fig. 4 is a sectional view along the line 4—4 of Fig. 1, looking in the direction of the arrows.
Fig. 5 is a sectional view along a line of 5—5 of Fig. 1, looking in the direction of the arrows.

Referring now to the drawings, Figs. 1 to 5 inclusive show an aircraft fuselage 1 and attached wing 2. As shown best in Fig. 3 the interior of the leading portion of the wing has a group of parallel ducts 3 to 7 inclusive which extend from near the root of the wings towards its outer end and terminate at their outer ends in a series of inlet ducts 8 to 12 inclusive which are open to the atmosphere at the leading edge of the wing 2. Where the ducts 3 to 7 terminate adjacent the root of the wing they are provided with outlet portions 13 to 17 inclusive which extend to and are flush with the wing surface at a portion where the air pressure will be at a low value compared with the air pressure at the leading edge where the inlet ducts 8 to 12 are located. In the embodiment illustrated and as shown in Fig. 4 the outlet portions 13 to 17, one for each duct, extend upwardly to the top forward section of the wing 2 where the air pressure during flight will normally be of a negative value. Thus, during flight of the aircraft, air will enter the inlet ducts 8 to 12, pass through the ducts 3 to 7 and be discharged from the wing through the outlet portions 13 to 17. An exhaust pipe 18 leading from the engine exhaust collector ring or the like, discharges through an elbow 19 at the root of the wing 2 and into the space bounded by the outer skin 20 and a metal partition 21 extending from the upper to the lower surface of the skin 20 and in a substantial vertical plane.

Figure 6:
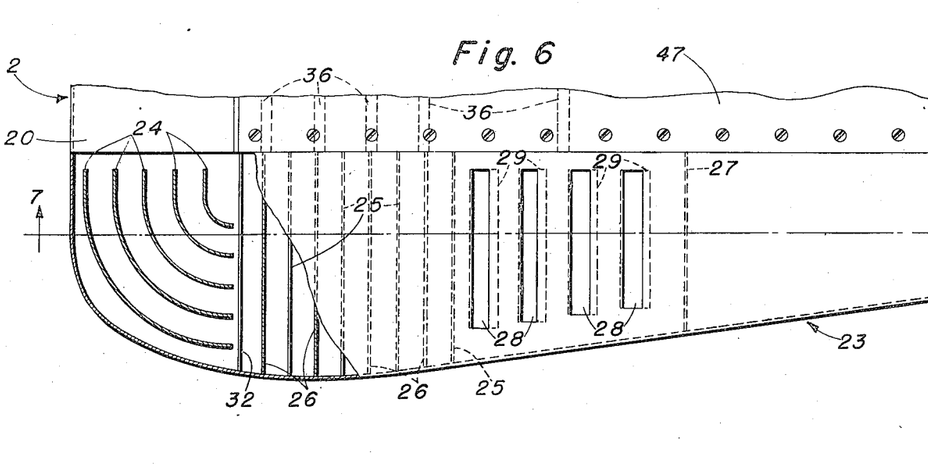
Fig. 6 is an enlarged top plan view of the wing tip shown in Fig. 1, and having some parts broken away.
Figure 7:
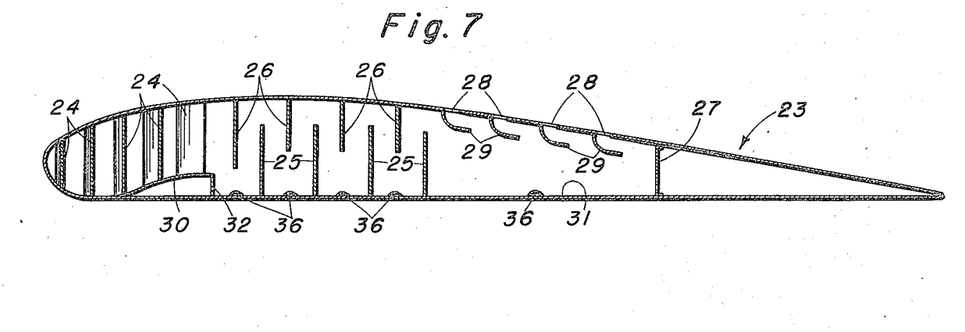
Fig. 7 is a sectional view substantially along the line 7—7 of Fig. 6 and looking in the direction of the arrows.

The hot exhaust gases entering the space 22 within the outer skin and forward of the partition 21 flow towards the outer end of the wing, passing between the ducts 3 to 7 throughout the length thereof and then discharging into the wing tip 23. The change in the direction of the exhaust gases is assisted by a number of curved baffles 24 within the forward portion of the wing tip so that as the gases pass through the wing tip they flow substantially from the leading to the trailing edge thereof. In their rearward passage through the wing tip, the gases follow a tortuous upward and downward path caused by alternate spaced upwardly and downwardly extending baffles 25 and 26 respectively. The exhaust gases do not pass completely to the trailing edge of the wing tip, since there is a vertical partition 27 or the like, forward of the trailing edge. On the top of the wing between the partition 27 and the rearmost baffle 25 are provided a series of discharge slits 28. As best shown in Fig. 7, the exhaust gases are again reversed in their direction of flow before they pass through the slits by baffles 29 which underlie each of the discharge slits 28.

During the passage of the exhaust gases through the wing from the root portion thereof to the wing tip their temperature is substantially reduced due to their contact with the relatively cold ducts 3 to 7 and with the relatively cold outer skin 20 so that by the time they reach the wing tip they have been cooled to such an extent that the moisture therein has been substantially condensed. Such moisture as has condensed and fallen to the floor of the outer skin 20 is carried over an inclined ramp 30 by the velocity of the exhaust gases, being trapped on the floor 31 of the wing tip by the vertical portion 32 of the ramp. Other condensed moisture which is still entrained in the rapidly moving exhaust gases is separated therefrom due to the rapid change in direction of flow of the exhaust gases during their tortuous flow between baffles 25 and 26, and fall from these baffles to the floor 31. Thus the cooled exhaust gases which are discharged through the slits 28 in the wing tip have substantially no moisture remaining therein which can condense to form vapor trails in the air. Furthermore, the exhaust gases have been so lowered in temperature and their path has been so relatively long that there is no flame remaining when the gases issue from the slits 28. The atmospheric air which has passed over the wing will under certain conditions of pressure and temperature have its moisture condensed out due to the changes resulting from the passage of the wing through the air. However, by the use of my invention they will have their temperature increased to an extent that the vapor in the atmosphere will not be condensed out and leave vapor trails. The leading portion of the wing forward of the partition 21 is warmed to such an extent by the passage of the exhaust gases therethrough that ice will not form thereon. Thus there is also provided an effective wing heater which will eliminate the well known troubles due to ice formation which is particularly dangerous when it forms on the leading portion of the wing.

Figure 1:
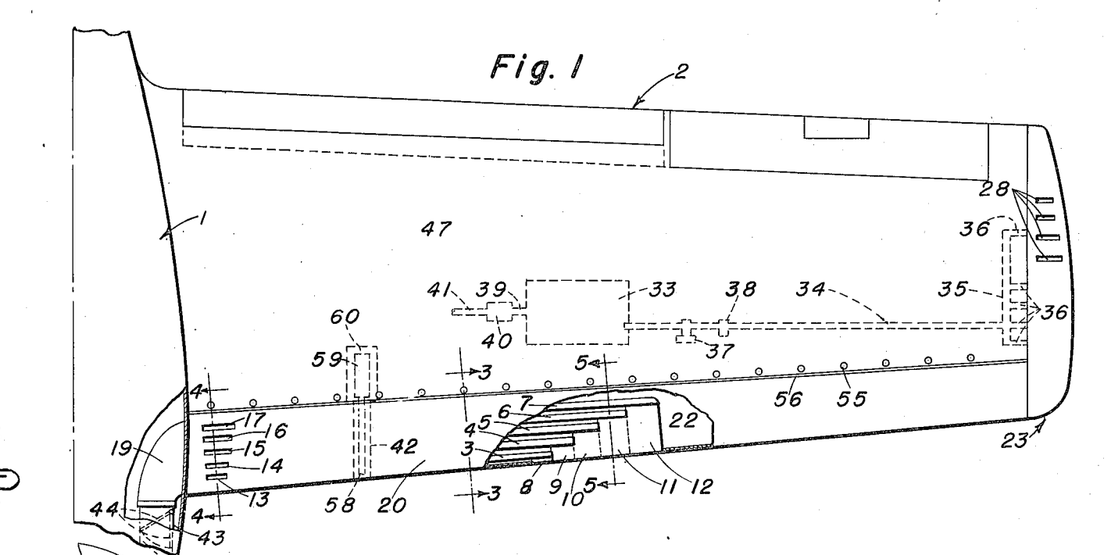
Fig. 1 is a top plan view, with some parts cut away, of an airplane wing showing an embodiment of my invention.
Figure 2:
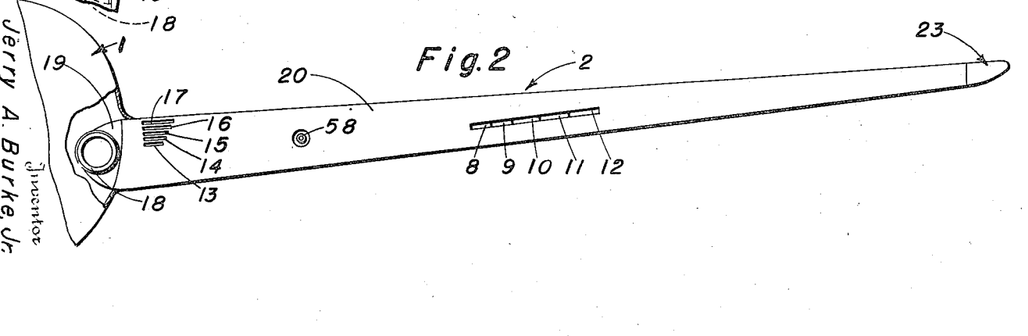
Fig. 2 is a front elevation of the wing shown in Fig. 1.

As shown in Fig. 1, a tank 33 is located within the wing structure and has an inlet pipe 34 leading to the wing tip 23. At its outer end pipe 34 is connected to a condensate discharge manifold 35 having connections 36 to the floor 31 of the wing tip, thus the water which collects on the floor of the wing tip passes through the connections 36 to manifold 35 and pipe 34 to the tank 33 where it is stored for use. A suction pump 37 acts to withdraw the water from the wing tip to the tank through the aforesaid path and a strainer 38 in the pipe 34 on the inlet side of the pump removes carbon or other solid articles from the water. At the point where the pipe 34 discharges into the tank a spray device is provided whereby entrapped gases are released from the water. This spray device and an automatic gas vent means for the tank are of conventional form and not shown. The discharge 39 from the tank connects to a suitable purifier 40 which removes any impurities which are undesirable, depending upon the use to which the water is to be put. The particular structure of the purifier 40 is not important and forms no part of this invention since it will vary in construction depending upon the use to which the water will be put and the impurities found in the water. From the purifier the water passes through a pipe 41 to the water distribution system, not shown. The connections by which the water will be supplied to the water injection system of the engine or to fire fighting equipment or drinking water supply, etc., similarly form no part of this invention and are not shown.

The machine gun shown in dotted lines in Fig. 1 and the details of the warming system will be described subsequently, but as shown in Fig. 5, a cylinder 42 within which is located the machine gun barrel, passes through the leading portion of the wing and through the ducts 3 to 7 inclusive as shown.

During periods of engine starting, warm-up, or take-off, the exhaust gases may be discharged directly from the exhaust pipe 18 to the atmosphere without passing through the condenser if desired. This is accomplished by providing a discharge opening 43 in the exhaust pipe just before it enters the elbow 19. A pivoted flap valve 44 is rotated to the position shown in dotted lines in Fig. 1 whereby it closes the entrance to the elbow 19 and at the same time uncovers the discharge opening 43. When positioned to close the discharge opening, the valve 44 does not impede the passage of the exhaust gases to the elbow. As shown in Fig. 3, the wing has a main spar 46 extending substantially vertically between the upper and lower wing surfaces 47 and 48. The forward portion of the wing surface which contains the condenser in accordance with my invention is so constructed that it may be disassembled as a unit from the main portion of the wing. As shown in Fig. 3, the partition 21 has rearwardly extending flanges 49 and 50 which extend to the rearward edges of the outer skin 20, both at its upper and lower edges. The upper and lower wing surfaces 47 and 48 are fastened to flanges 51 and 52 which extend forwardly of the main spar 46, terminating at the forward edges of the wing surfaces 47 and 48. A cover plate 53 bridges the gap between flanges 50 and 51, said cover plate being attached to the flange 50 and the skin 20 as by rivets 54. The flanges 49 and 52 are similarly bridged by a cover plate 53a which is fastened to flange 49 and the outer skin 20 in a similar manner as is cover plate 53. The partition 21 locates the skin 20 at its upper and lower rearward edges so that they are flush with the forward edges of the upper and lower wing surfaces 47 and 48, and makes the entire condenser section of the wing forward of the partition 46 and the wing surfaces 47 and 48 a unitary structure which can be attached to or detached from the main wing section by merely removing screws 55 which pass through the forward part of the wing surface 47, the flange 51, and the cover plate 53 as shown in Fig. 3. The lower wing surface forward of the partition 46 is fastened to the cover plate 53a in the same manner. A gasket seal 56 is used between flanges 51 and cover plate 53 and between flange 52 and the cover plate 53a, and turns outwardly to pass between the rearward edges of the outer skin 20 and the forward edges of the upper and lower wing surfaces 47 and 48 as shown in Fig. 3 to seal the joint against the entrance of moisture or the like. An insulation wall 57 extends vertically between the cover plates 53 and 53a as shown, being fastened thereto in any desired manner. This insulation wall substantially prevents the passage of heat from the relatively hot condenser section to the main part of the wing.

Figure 8:
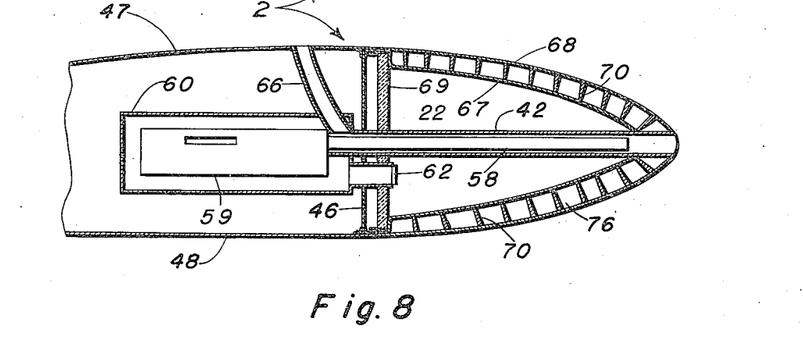
Fig. 8 is a sectional view in a side elevation through a portion of the wing showing details of a machine gun installation.
Figure 9:
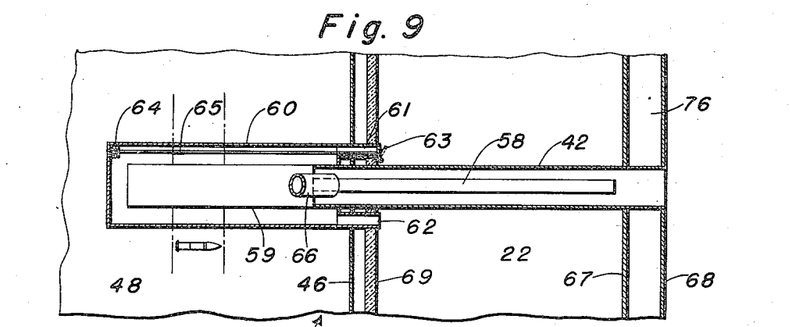
Fig. 9 is a plan view partially in section of the machine gun installation of Fig. 8.

Figs. 8 and 9 show a machine gun installation in a wing having a condenser built in accordance with another embodiment of my invention. The barrel 58 of the machine gun extends through the cylinder 42 from the machine gun 59 to near the front end of the cylinder. A casing 60 surrounds the machine gun and has an inlet port 61 best shown in Fig. 9. Air entering this port passes into the chamber 60 and around the machine gun therein, then back into the condenser space through an exit port 62. The inlet port 61 is provided with a flap valve 63 so pivoted about a vertical axis that when in an open position it directs air into the port 61. The position of the flap valve is controlled by a thermostat 64 within the casing 60 and having a connecting link 65 to the valve, so that as the temperature within the casing 60 increases to a maximum desired value, expansion of the thermostat 64 will close the valve 63 or so position it that the volume of air entering the inlet port will keep the temperature within the casing substantially constant. The cylinder 42 has its forward end open to the atmosphere at the front of the wing, and at its rear end is provided with an exhaust duct 66 discharging to a low pressure area on the top of the wing. Air entering the cylinder 42 at its forward end passes over the barrel 58 of the gun and discharges from the duct 66, thus keeping the gun barrel cool during operation. The air which passes through the casing 60 from the condenser section has been sufficiently warmed during its passage in heat exchange relationship with the exhaust gases travelling in the opposite direction so that it maintains the machine gun 59 warm enough for operation even though the airplane is operating at altitudes where the temperature is very low. The particular condenser shown in Figs. 8 and 9 is of the type shown in Fig. 12, and which will be described.

Figure 10:
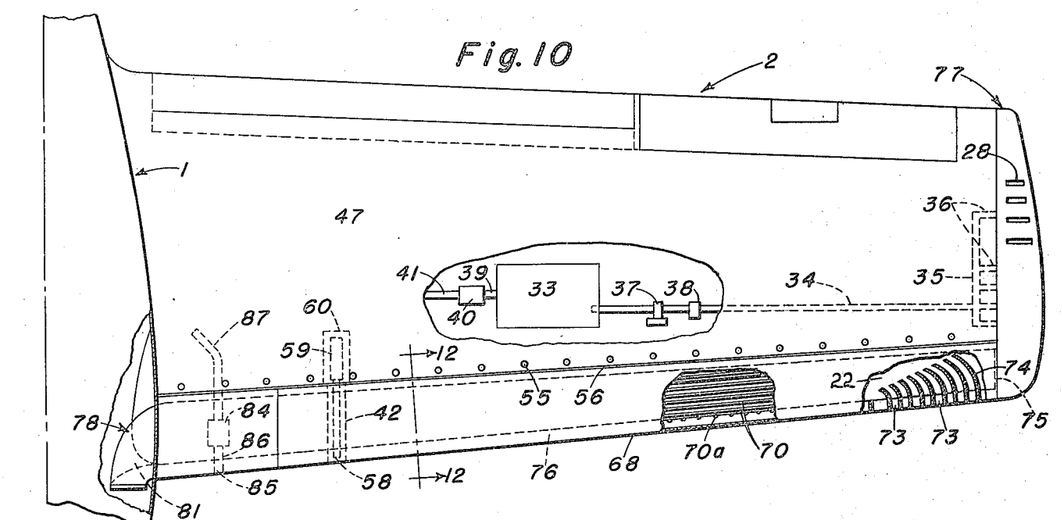
Fig. 10 is a top plan view similar to Fig. 1 but illustrating another embodiment of my invention.
Figure 11:
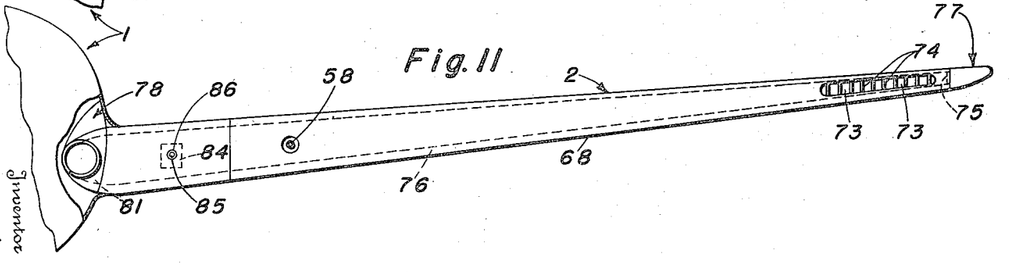
Fig. 11 is a front elevation of the wing shown in Fig. 10.
Figure 12:
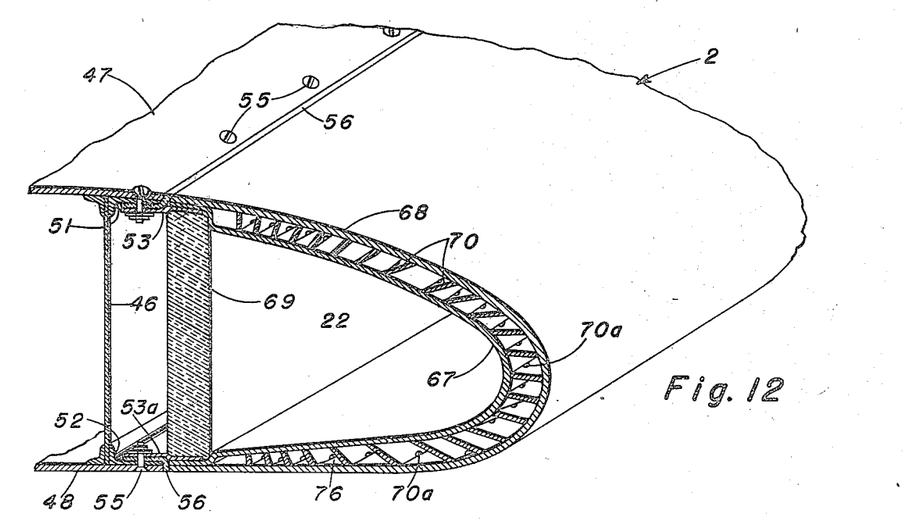
Fig. 12 is a sectional view substantially along the line 12—12 of Fig. 10 illustrating one embodiment of the condenser used in the apparatus of Fig. 10.
Figure 13:
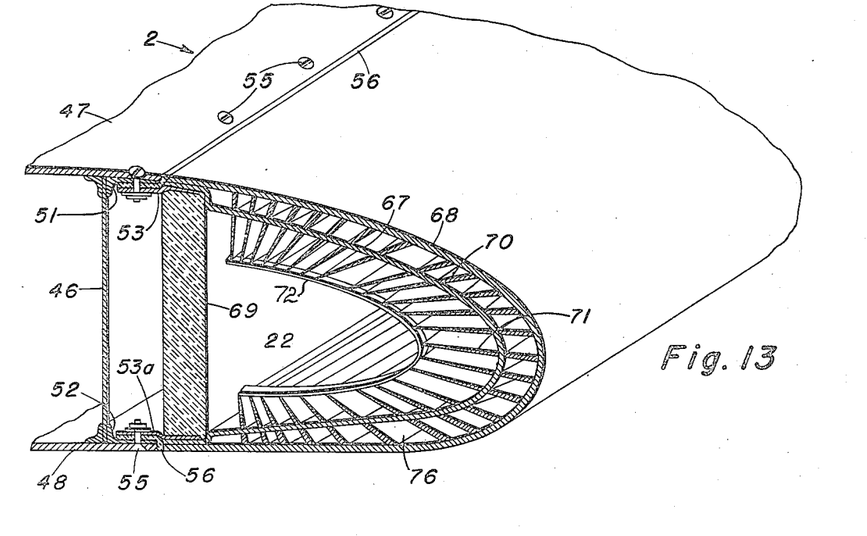
Fig. 13 is a sectional view similar to Fig. 12 but illustrating another embodiment of the condenser.

Figs. 10 and 11 illustrate another embodiment of my invention wherein atmospheric air is taken into the interior of the wing and passed in counter-flow heat exchange relationship with the exhaust gases and then discharged again to the atmosphere. Figs. 12 and 13 illustrate two types of condenser unit structures which form the forward part of the wing. In both of these types a heat conducting wall 67 is located substantially concentrically within the outer skin 68 of the condenser section and slightly spaced therefrom, extending forwardly from the insulation wall 69. The spaced outer skin 68 and the wall 67 thus provide a substantially U-shaped conduit extending from the root of the wing to the wing tip. A series of substantially radially extending heat conducting partitions 70 in Fig. 12 extend transversely of the space between the wall 67 and the skin 68 to divide the conduit into a number of smaller conduits. The partitions 70, being heat conducting, serve to transmit heat from the exhaust gases to the wall 67 and skin 68 and also to channelize the flow of the exhaust gases. In the modification shown in Fig. 13, the radial partitions 70 are continued past the wall 67 into the space normally occupied by the cold atmospheric air, these extensions being indicated by the referenced No. 71. The extensions are connected together by a reenforcement member 72, as shown in Fig. 13, these reenforcement members being located at spaced intervals along the length of the wing. As will be apparent, the extensions 71 increase the rate of heat transfer from the hot exhaust gases to the atmospheric air flowing through the wing.

The atmospheric air enters the zone between the insulation wall 69 and the heat conducting wall 67 adjacent the outer end of the wing through series of inlet ports 73 as shown in Figs. 10 and 11. These inlet ports pass through the outer skin 68 and the wall 67 so that there is no mixture of exhaust gases with the atmospheric air, and the said ports terminate in a series of curved baffles 74 which direct the air inwardly towards the root of the wing. The passage of the atmospheric air towards the wing tip is prevented by a closure 75 closing the end of the interior passageway 22 defined by the walls 67 and 69. However, the exhaust gases from the U-shaped conduit pass into the wing tip 77 in the same manner as previously described in connection with Figs. 1, 2, 6 and 7 where they are discharged and the condensate removed as also previously described. Openings 70a in the lowest parts of the partitions 70 permit drainage of water or condensate into the lowest part of the condenser unit, from which it may be removed by any suitable drainage means.

Figure 14:
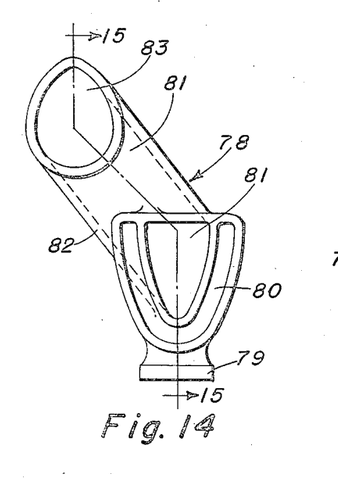
Fig. 14 is a side view in elevation of a double elbow duct used in the embodiment illustrated in Fig. 10.
Figure 15:
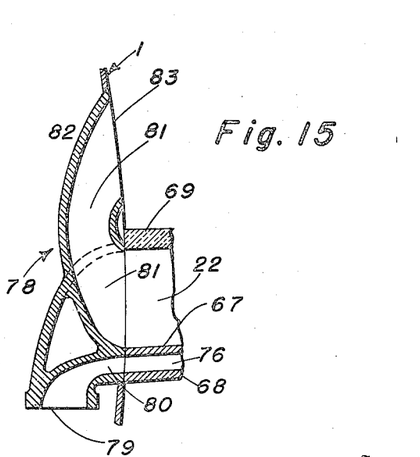
Fig. 15 is a sectional view substantially along the line 15—15 of Fig. 14.

Figs. 14 and 15 show a double elbow connection 78 at the root of the wing by which means the hot exhaust gases pass into the condenser units shown in Figs. 10 to 13. As shown in Figs. 14 and 15 the connections 78 include one elbow 79 which receives the hot exhaust gases from the exhaust pipe and directs them through an outlet 80 which is substantially the same in cross-section as that of the exhaust gas conduit defined by walls 67 and the outer skin 68 at the root of the wing. The connections 78 also include a conduit 81 which at its inlet end has the same cross-section as the atmospheric air passageway 22 at the root of the wing. The conduit 81 is defined by a curved tubular wall 82 which discharges the atmospheric air through an opening 83 in the side of the fuselage. The inlet of the exhaust passageway of the elbow 78 may be provided with a closure and the conduit 81 may be similarly provided with a closure as will be understood, neither of these being shown. Such closures permit the blocking off of the flow of exhaust gases or atmospheric air through the wing when desired. When passage of the exhaust gases through the condenser is blocked in such manner, they are discharged from the exhaust pipe before they reach the elbow 78 in the same manner as illustrated by the discharge opening and flap valve 44 of Fig. 1.

Figs. 10 and 11 also illustrate the application of a heat exchange device to my invention for the purpose of heating atmospheric air as for cabin warming, etc. A heat exchange device 84 is located within the passageway 76 so that it is warmed by the heated atmospheric air about to be discharged into the atmosphere. Atmospheric air to be heated within the heat exchanger is admitted through an opening 85 in the leading edge of the wing and passes through a conduit 86 to the heat exchanger 84 from which it is led to the cabin or the like by a conduit 87.

Figure 16:
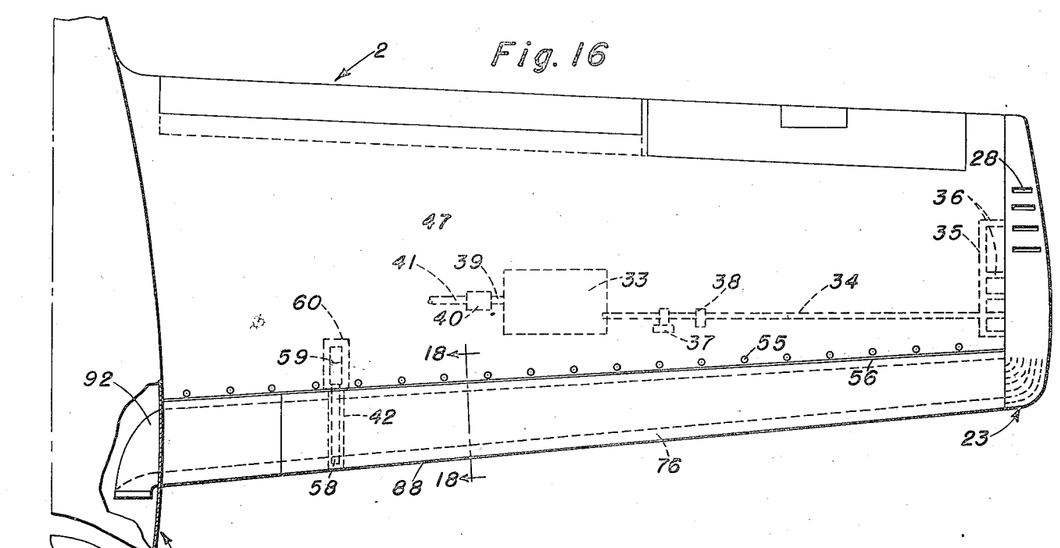
Fig. 16 is a top plan view of a wing employing a third embodiment of my invention.
Figure 17:
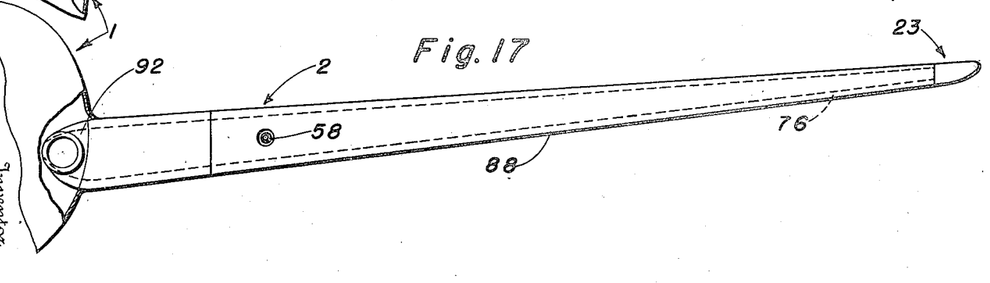
Fig. 17 is a front elevation of the apparatus shown in Fig. 16.
Figure 18:
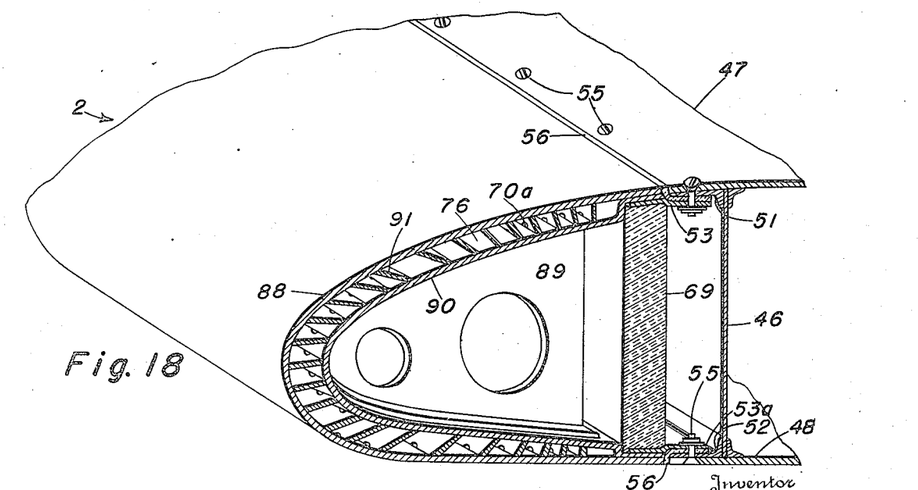
Fig. 18 is a sectional view in elevation substantially along the line 18—18 of Fig. 16 and looking in the direction of the arrows.

Figs. 16 and 17 illustrate an embodiment of my device wherein the hot exhaust gases are passed through the wing through a substantially U-shaped conduit as shown in Fig. 18 and having substantially the same structure as the modification shown in Fig. 12. In the embodiment of Figs. 16 and 17, however, no provision is made for passing atmospheric air through the wing to cool the exhaust gases, the cooling effect of the outer skin 88 being relied on to remove the heat from the gases. Reenforcing members or brackets 89 extending between the spaced portions of the wall 90 serve to strengthen the wall 90 as well as the outer skin 88, there being partitions 91 between the skin 88 and wall 90 as shown. The wall 90 is of heat conducting material as are the partitions 91 so that they may be heated by the exhaust gases and transmit the heat to the outer skin 88. At the root of the wing an elbow 92 takes exhaust gases from the exhaust pipe in the same manner as does the elbow 78 of Figs. 10 and 11, discharging these gases into the space between the wall 90 and skin 88 at the wing root. As will be understood, however, the elbow 92 is of simpler construction than elbow 79 since it does not also have to accommodate the atmospheric air being exhausted from the wing. The wing tip construction wherein the condensed moisture is separated from the exhaust gases is of the same construction as that more specifically described in connection with the embodiment of Figs. 1 and 2, and the water collection, storage, and purification apparatus is also of the same general type.

It will be understood that means, not shown, may be provided to drain moisture from the conduits which carry the exhaust gases, because there will at times be condensate remaining in these ducts after a flight, and where the wings have a dihedral as shown in the figures, this water would otherwise remain in these conduits and drain to the root of the wing. In a similar manner the ducts 3 to 7 are provided with drainage means adjacent the root of the wing to provide for drainage of water which may be separated from the atmospheric air during its flow through these ducts.

The structure of each of the illustrated embodiments of my invention is such that the condenser unit may be removed from the wing for cleaning, repairs, etc., by removing the screws 55 from the top and bottom parts of the wing as shown in Fig. 3.

My invention, therefore, provides means for condensing the water from the exhaust gases of heavier than air aircraft without disturbing the aerodynamic characteristics of the plane by the addition of exterior heat exchanges or the like, such as has been customarily used in lighter than air aircraft. A large supply of water is provided which can be used for water injection for the engine, for fire fighting as by the use of water fog, and for the use of personnel aboard the craft when adequately purified. Because of the construction of my device the formation of ice on the wings during flight is prevented, exhaust flames are dampened and rendered invisible, condensate trails from either the exhaust gases or from changes in pressure resulting from the passage of the aircraft through the air are eliminated, and means for heating mechanical devices such as machine guns, or the like, are provided. While only one wing of the aircraft is illustrated, it will be understood that the opposite wing is provided with the same equipment in order to balance the aircraft statically. If other equipment is stored in the opposite wing so that it is not necessary to build a condenser into each wing for balance, then a condenser in only one wing can be designed to adequately remove the moisture from the exhaust gases and to accomplish all of the above described ends.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

I claim:

1. In an airplane wing; means within said wing forming a first conduit for exhaust gases, so arranged that the exhaust gases passing through said conduit are in heat exchange relationship with the air passing over the exterior surface of the wing; means within said wing forming a second conduit for atmospheric air so arranged that the air within said second conduit and the exhaust gases in said first conduit are in heat exchange relationship; means for delivering atmospheric air to and discharging the air from said second conduit; baffle means for collecting condensate from said first conduit, and means for storing the condensate.

2. In an airplane wing; a first conduit for exhaust gases extending longitudinally within said wing, the surface of the wing forming a portion of the wall of the conduit; a second conduit paralleling said first conduit within said wing, there being a common conducting wall between said first and second conduits; means for admitting and discharging atmospheric air to said second conduit; baffle means for collecting condensate from said first conduit, and means for storing the condensate.

3. In an airplane wing; means within the wing forming a conduit for exhaust gases, so arranged that the exhaust gases passing through said conduit are in heat exchange relationship with the air flowing over the wing and the direction of flow of the exhaust gases is towards the outer end of the wing; a wing tip; means forming a tortuous passageway for exhaust gases within said wing tip whereby water particles in the exhaust gases are separated, said tortuous passageway being connected at its inlet end to said conduit; means for discharging exhaust gases from said tortuous passageway into the atmosphere; and means for collecting condensate from said wing tip.

4. In an airplane wing; a partition extending between the upper and lower surfaces of the wing and spaced from the leading edge to form a conduit; means forming an atmospheric air inlet to said conduit adjacent an outboard portion of said wing and an atmospheric air outlet adjacent an inboard portion thereof; a second partition between said first partition and the skin portion of the wing and substantially concentric with and separated from the skin to form a second conduit; means forming an exhaust gas inlet to said second conduit adjacent an inboard portion of said wing and an exhaust gas outlet adjacent an outboard portion thereof; and means for separating and removing condensate from said second conduit.

5. In the device described in claim 4 a series of heat conducting partitions extending between said second partition and the skin of the wing to facilitate the transfer of heat from the exhaust gases to said second partition and to the skin.

6. In the device described in claim 4 a series of heat conducting partitions extending between said second partition and the skin of the wing to facilitate the transfer of heat from the exhaust gases to said second partition and to the skin; and a series of heat transmitting fins extending from said second partition towards said first partition to facilitate the transfer of heat from said second partition to the atmospheric air between said first and second partitions.

7. In an airplane structure having a wing and a power plant which exhausts gases that include water vapor; means within said wing forming a conduit for the exhaust from the power plant, so arranged that said exhaust gases are in heat exchange relationship with the air flowing over the wing; means for discharging said exhaust gases from said wing; means for collecting condensate from said conduit; a water storage tank; a conduit connecting said collecting means and said tank; and water purification means connected to said tank.

8. In the device described in claim 1 a machine gun installation in the wing; a casing surrounding portions of the machine gun; means forming an inlet from said second conduit to said casing; temperature responsive means to open and close said inlet; and an outlet for air from said casing.

JERRY A. BURKE, Jr.

REFERENCES CITED

The following references are of record in the file of this patent:

UNITED STATES PATENTS

| Number | Name | Date |
| --- | --- | --- |
| 1,749,858 | Toomey et al. | Nov. 11, 1930 |
| 1,987,604 | Corbett | Jan. 15, 1935 |
| 2,168,166 | Larrecq | Aug. 1, 1939 |
| 2,310,767 | Durr | Feb. 9, 1943 |
| 2,320,870 | Johnson | June 1, 1943 |

FOREIGN PATENTS

| Number | Country | Date |
| --- | --- | --- |
| 409,834 | Great Britain | May 10, 1934 |